United States Patent
Patel et al.

(10) Patent No.: US 10,796,425 B1
(45) Date of Patent: Oct. 6, 2020

(54) IMAGERY-BASED MEMBER DEFORMATION GAUGE

(71) Applicant: Amazon Technologies, Inc., Seattle, WA (US)

(72) Inventors: Mark A. Patel, Seattle, WA (US); Alex Wilson Nash, Seattle, WA (US); Brian Satzinger, Seattle, WA (US); Paul Viola, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 493 days.

(21) Appl. No.: 15/257,635

(22) Filed: Sep. 6, 2016

(51) Int. Cl.
| | | |
|---|---|---|
| *G06T 7/00* | (2017.01) | |
| *G06T 7/285* | (2017.01) | |
| *B64C 39/02* | (2006.01) | |
| *B64D 47/08* | (2006.01) | |
| *H04N 13/243* | (2018.01) | |

(52) U.S. Cl.
CPC .......... *G06T 7/0004* (2013.01); *B64C 39/024* (2013.01); *B64D 47/08* (2013.01); *G06T 7/285* (2017.01); *H04N 13/243* (2018.05); *B64C 2201/108* (2013.01); *B64C 2201/127* (2013.01); *G06T 2207/30164* (2013.01)

(58) Field of Classification Search
CPC ............... H04N 13/239; H04N 13/246; H04N 2013/0081; H04N 13/204; H04N 5/247; H04N 13/243; H04N 13/128; B60R 1/00; B60R 2300/105; B60R 2300/107; B60R 11/04; G06T 7/85; G06T 2207/10012; G06T 7/593

USPC ...... 348/43, 46, 47, 148; 382/104, 154, 294; 701/34.4, 42

See application file for complete search history.

(56) References Cited

U.S. PATENT DOCUMENTS

| | | | | |
|---|---|---|---|---|
| 5,086,651 A | * | 2/1992 | Westermo | G01B 7/24 73/763 |
| 5,220,441 A | * | 6/1993 | Gerstenberger | G06F 17/153 348/135 |
| 5,383,133 A | * | 1/1995 | Staple | B64C 27/001 340/963 |
| 5,668,595 A | * | 9/1997 | Katayama | G06T 3/0075 348/218.1 |

(Continued)

OTHER PUBLICATIONS

Nathaniel J. Short, "3-D Point Cloud Generation from Rigid and Flexible Stereo Vision Systems." Master's thesis, Virginia Polytechnic Institute and State University, 2009 (Year: 2009).*

(Continued)

*Primary Examiner* — Daniel Chang
(74) *Attorney, Agent, or Firm* — Lee & Hayes, P.C.

(57) ABSTRACT

A stereo camera pair may be used to determine deformation and/or strain on a member based on differences in calculated movement of the cameras that capture images. In some embodiments, a first camera may be mounted to a first end of a member and a second camera may be mounted to a second end of the member opposite the first end. As the member bends, twists, or deforms in other ways, the deformation may be detectable based on differences in images captured by the first and second camera. This data may be used to detect possible wear or damage to the member, as a control input to a vehicle to reduce possible wear or damage to the member, as a prompt to initiate maintenance or inspection of the member, and/or for other reasons.

20 Claims, 9 Drawing Sheets

(56) References Cited

U.S. PATENT DOCUMENTS

| | | | | |
|---|---|---|---|---|
| 5,798,791 | A * | 8/1998 | Katayama | G06T 1/0007 348/218.1 |
| 6,269,175 | B1 * | 7/2001 | Hanna | G06T 5/50 382/107 |
| 6,385,334 | B1 * | 5/2002 | Saneyoshi | H04N 13/111 382/154 |
| 6,480,792 | B1 * | 11/2002 | Prendergast | G07C 3/00 702/42 |
| 8,797,387 | B2 * | 8/2014 | Huggett | H04N 13/246 348/46 |
| 9,686,539 | B1 * | 6/2017 | Zuliani | H04N 13/239 |
| 9,877,016 | B2 * | 1/2018 | Esteban | G02B 27/0172 |
| 10,489,912 | B1 * | 11/2019 | Brailovskiy | G06T 7/002 |
| 2002/0012043 | A1 * | 1/2002 | Guerin | H04N 13/189 348/47 |
| 2003/0210807 | A1 * | 11/2003 | Sato | G08G 1/166 382/104 |
| 2006/0227041 | A1 * | 10/2006 | Okamoto | G01S 13/867 342/174 |
| 2007/0189599 | A1 * | 8/2007 | Ryu | G06K 9/46 382/154 |
| 2007/0285663 | A1 * | 12/2007 | Hewitt | H04N 13/346 356/399 |
| 2008/0144924 | A1 * | 6/2008 | Hoffmann | G06T 7/85 382/154 |
| 2008/0205706 | A1 * | 8/2008 | Hongo | H04N 7/183 382/104 |
| 2008/0239064 | A1 * | 10/2008 | Iwasaki | H04N 13/239 348/47 |
| 2009/0046924 | A1 * | 2/2009 | Morimitsu | G01C 11/06 382/154 |
| 2009/0309762 | A1 * | 12/2009 | Wolcken | B64D 45/00 340/945 |
| 2011/0069151 | A1 * | 3/2011 | Orimoto | G03B 35/00 348/42 |
| 2011/0085788 | A1 * | 4/2011 | Pace | G03B 35/08 396/325 |
| 2011/0085789 | A1 * | 4/2011 | Campbell | H04N 13/25 396/325 |
| 2011/0170748 | A1 * | 7/2011 | Aimura | G01C 3/085 382/106 |
| 2011/0199462 | A1 * | 8/2011 | Nanri | G08G 1/165 348/47 |
| 2011/0211751 | A1 * | 9/2011 | Thorpe | G06T 7/85 382/154 |
| 2011/0243543 | A1 * | 10/2011 | Pace | G03B 35/08 396/325 |
| 2011/0244881 | A1 * | 10/2011 | Bando | G01S 5/021 455/456.1 |
| 2012/0099798 | A1 * | 4/2012 | Saruta | G01B 11/002 382/203 |
| 2012/0147139 | A1 * | 6/2012 | Li | H04N 13/122 348/43 |
| 2012/0236125 | A1 * | 9/2012 | Umezawa | G01C 3/085 348/47 |
| 2012/0257018 | A1 * | 10/2012 | Shigemura | G02B 30/27 348/46 |
| 2012/0274627 | A1 * | 11/2012 | Huggett | G06T 7/85 345/419 |
| 2013/0033584 | A1 * | 2/2013 | Seo | G03B 17/14 348/47 |
| 2013/0120528 | A1 * | 5/2013 | Schlosser | H04N 13/167 348/43 |
| 2013/0128000 | A1 * | 5/2013 | Ko | H04N 13/296 348/47 |
| 2013/0222554 | A1 * | 8/2013 | Hayashi | G06T 3/606 348/50 |
| 2013/0241182 | A1 * | 9/2013 | Rao | E05B 77/12 280/735 |
| 2013/0242113 | A1 * | 9/2013 | Tanaka | H04N 5/23212 348/169 |
| 2013/0335550 | A1 * | 12/2013 | Rochenski | G08B 21/0476 348/82 |
| 2014/0168377 | A1 * | 6/2014 | Cluff | H04N 13/246 348/47 |
| 2014/0184799 | A1 * | 7/2014 | Kussel | H04N 17/002 348/148 |
| 2014/0300704 | A1 * | 10/2014 | Ramaswamy | G06T 7/85 348/48 |
| 2015/0049193 | A1 * | 2/2015 | Gupta | H04N 17/002 348/148 |
| 2015/0181199 | A1 * | 6/2015 | Yu | H04N 13/246 348/47 |
| 2015/0310623 | A1 * | 10/2015 | Smith | G06T 7/285 348/43 |

OTHER PUBLICATIONS

Warren, Michael & Upcroft, Ben; "High altitude stereo visual odometry." In Proceedings of Robotics: Science and Systems IX, Technische Universität Berlin, Berlin, Germany (2013) (Year: 2013).*

* cited by examiner

IMAGERY-BASED MEMBER DEFORMATION GAUGE

BACKGROUND

Like all vehicles, aircraft need occasional repair and maintenance to perform as intended by an operator. In some instances, an aircraft may experience stress on an airframe and/or various members coupled to the airframe during operation. Typically, strain sensors are used to determine a strain at a discrete location, such as a specific point on a member or a joint connecting members. These strain gauges typically measure physical forces imposed on the discrete location, such as via a mechanical devices and/or electromechanical devices coupled to a member. The strain sensors may determine that a parameter is out of a standard operating range, and in response, may trigger a notification to a controller of the aircraft. The controller may then take action, based on the notification, such as to expedite landing, or to take other action. In some instances, the aircraft may require maintenance before initiating another flight. Any downtime the aircraft has due to maintenance being performed on the aircraft can be expensive and disruptive to an entity that deploys the aircraft.

Stereo camera pairs are used in computer vision to create a three-dimensional model of the surrounding environment. One requirement for such a system is for the cameras to be spaced apart from each other so that there is a measurable difference in the image seen by each camera, thereby allowing ranges in depth to be detected and quantified. The relative position and orientation of the two cameras are typically rigidly maintained in order for stereo algorithms to work correctly.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure is generally directed to using a stereo camera pair to determine deformation and/or strain on a member based on differences in calculated movement of the cameras that capture images. For example, a first camera may be mounted to a first end of a member and a second camera may be mounted to a second end of the member opposite the first end. As the member bends, twists, or deforms in other ways, the deformation may be detectable based on differences in images captured by the first and second camera. This data may be used to detect possible wear or damage to the member, as a control input to a vehicle to reduce possible wear or damage to the member, as a prompt to initiate maintenance or inspection of the member, and/or for other reasons.

On a vehicle such as an unmanned aerial vehicle (UAV), vehicle weight constraints often prohibit the use of heavily engineered camera mounting structures, and therefore the two cameras in a pair may need to be mounted on two distinct parts of an airframe or other structure. As a result, flex and other types of deformation in the airframe or other structure can potentially disrupt alignment of the camera pair. However, analysis of images captured by the camera pair may be used to quantify the movement of the cameras relative to one another while also determining movement (deformation) and forces (strain) that the airframe or other structure is subject to during operation. Over time, the deformation of the airframe may become greater due to deterioration of the airframe, which when measured using the techniques described herein, may enable an early determination for maintenance or replacement of the airframe, or portion thereof.

In various embodiments, the stereo camera pair may be used to calculate distances of objects. The calculation may use a difference in location between objects in images taken from cameras at two different locations, while assuming the cameras are fixed relative to one another. When a member that supports the cameras deforms, this assumption is invalid and can cause error in the calculation of distances of objects included in the images. However, using the technique described herein, the movement of the cameras relative to one another may be quantified, and compensated for to reduce this possible error in the calculation of distances of objects included in the images.

The techniques and systems described herein may be implemented in a number of ways. Example implementations are provided below with reference to the following figures.

Figure 1:
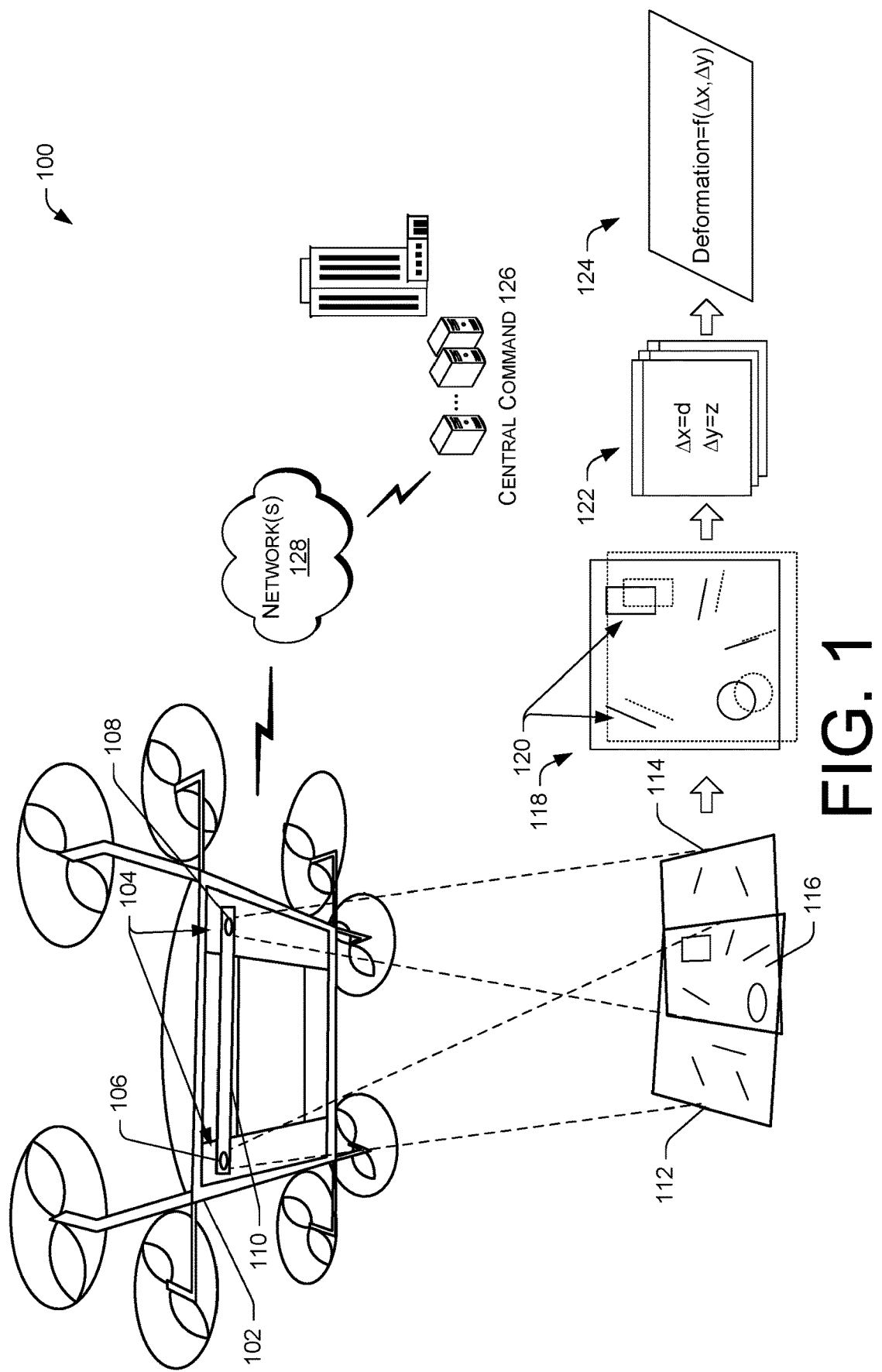
FIG. 1 is a schematic diagram of an illustrative unmanned aerial vehicle (UAV) that deploys an imagery-based member deformation gauge.

FIG. 1 is a schematic diagram of an illustrative environment 100 that includes an unmanned aerial vehicle (UAV) 102 that includes a stereo camera pair 104. The stereo camera pair 104 includes a first camera 106 and a second camera 108 mounted on a structure 110, such as a member or an airframe. The first camera 106 may be separated from the second camera 108 by a distance. The first camera 106 may include a first field of view 112 while the second camera may include a second field of view 114. An overlapping field of view 116 may exist where the first field of view 112 overlaps the second field of view 114. The stereo camera pair 104 may be configured to determine distances of objects present in the captured imagery. In addition, as disclosed herein, the imagery obtained by the stereo camera pair may be processed to determine a deformation and/or a strain on the structure 110 when the stereo camera pair is configured to operate as an imagery-based member deformation gauge. Rather than determining deformation and/or strain at localized points along the structure, the techniques discussed herein determine a strain across the structure between the mounting locations of the first camera 106 and the second camera 108.

Images 118 may be generated over time by the stereo camera pair 104. The overlapping portion of the images from each camera may be analyzed by comparing corresponding features 120 and determining separation distances associated with at least some of the corresponding features 120. For example, the images 120 may include a first image captured by the first camera 106 and a second image captured by the second camera 108. However, the images 120 may include a first image captured by the first camera 106 and a second image captured by the first camera 106 at a later point in time, such as a next frame of imagery.

Through analysis of the images 120 and possibly additional images obtained over time, a change in displacement 122 of the corresponding points may be calculated, such as through use of homography. The change in displacement 122 may be translated into a change in direction (alignment) of the first camera 106 relative to the second camera 108.

In various embodiments, the change in displacement 122, when observed over time, may be used to determine a deformation 124 imposed on the structure 110 that supports the first camera 106 and the second camera 108. The deformation may be expressed as a deformation metric (e.g., distance), a change in angle (e.g., caused by torsional forces imposed on the structure), and/or a force applied to the structure (possibly along with a direction of the force).

In some embodiments, the analysis and calculations discussed above may be performed by a central command 126 or other entity that receives or accesses images from the stereo camera pair 104 via a network 128. However, the analysis and calculations discussed above may be performed in real-time or near real-time (to account for minimal processing time) by one or more processors onboard the UAV 102.

In addition to determination of the deformation of the structure 110, the change in displacement 122 may be used to calibrate or otherwise reduce or remove error included in distance calculations of objects made possible by the stereo camera pair 104. For example, an algorithm may compensate for movement of the first camera 106 relative to the second camera 108, which may improve accuracy of distance calculations.

Although the disclosure discusses determination of a deformation of the structure, it is understood that the deformation can be translated to a strain, stress, or other force-based value base on a known distance of a member, material (s) that form the member, a cross-sectional profile of the member, and/or other known information. Thus, strain of the member may be calculated once deformation is known, or vice versa.

Figure 2A:
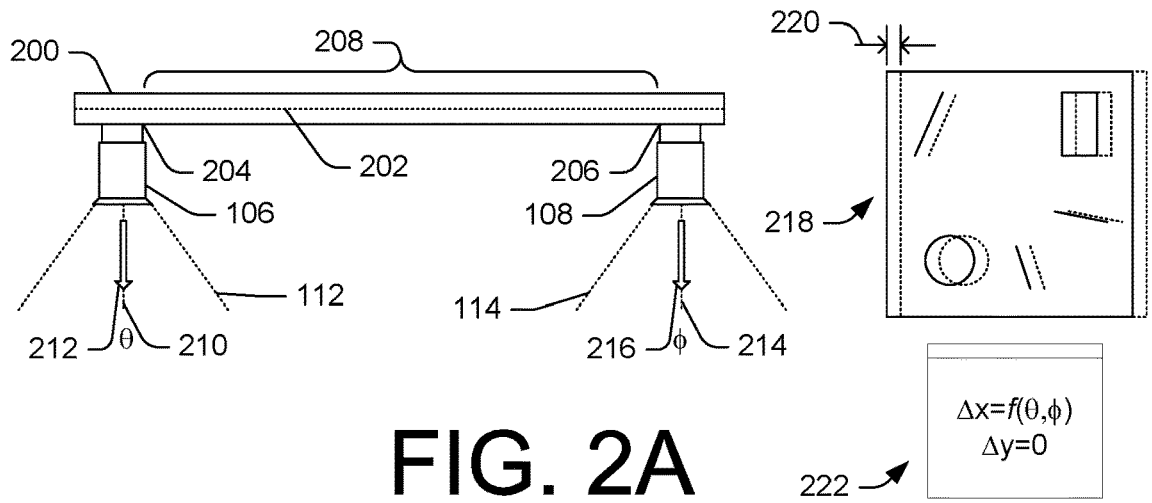
FIG. 2A-C are schematic diagrams showing deformation (bending) of an illustrative member and imagery captured by a stereo camera pair used to measure the deformation of the member.
Figure 2B:
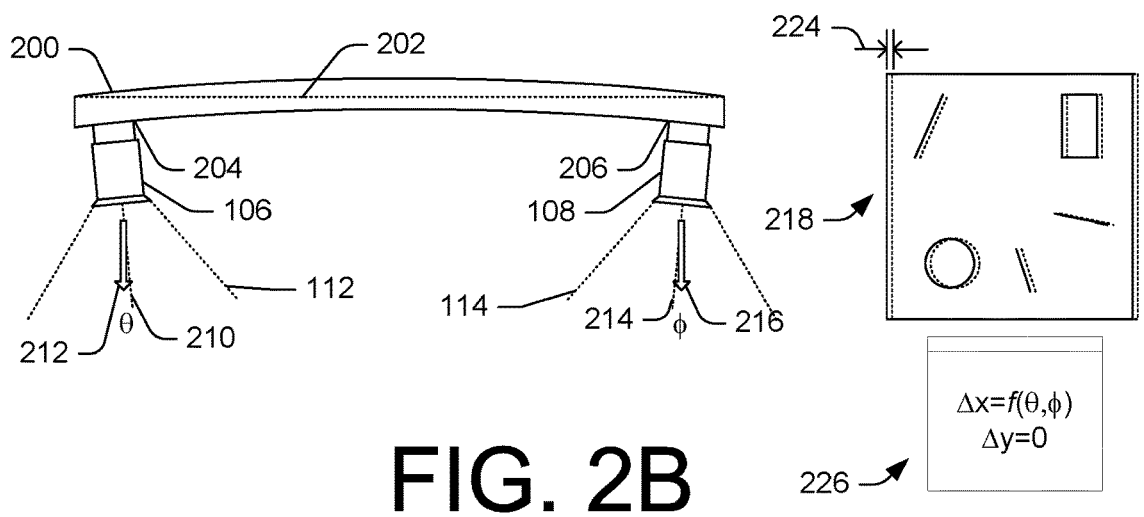
Figure 2C:
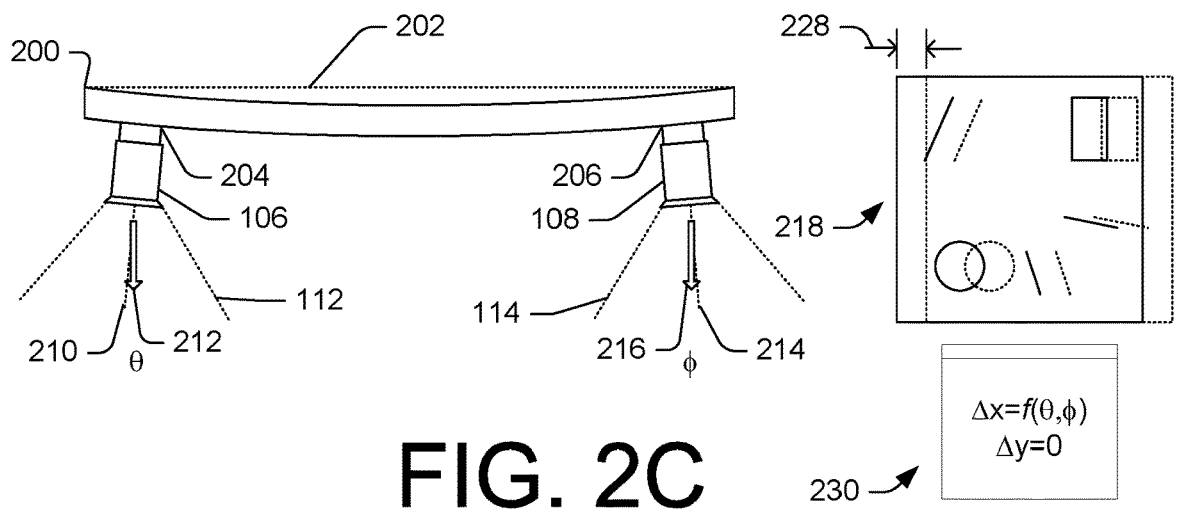

FIG. 2A-C are schematic diagrams showing deformation (bending) of an illustrative member 200 and imagery captured by a stereo camera pair used to measure the deformation of the member. As shown in FIG. 2A, the member 200 may be a straight structure (as shown in comparison with a reference line 202) and subject to little or no distortion due to forces imparted on the member 200. The forces may be due to impact with objects (e.g., the ground, another vehicle, debris, etc.), force due to inertial forces, and/or other forces which cause deformation of structures.

The member 200 may include the first camera 106 mounted at a first location 204 on the member 200 and the second camera 108 mounted at a second location 206 on the member 200. A portion 208 of the member 200 may span between the cameras. Using the techniques discussed herein, a deformation across the portion 208 of the member 200 may be determined rather than just a deformation at a specific location on or in the member 200.

In the non-deformed state shown in FIG. 2A, the first camera 106 may be directed in a first direction 210 within the first field of view 112, which may be parallel with a first reference direction 212 ($\sigma$=zero, where $\sigma$ is a first separation angle between the first direction 210 and the first reference direction 212). Similarly, the second camera 108 may be directed in a second direction 214 within the second field of view 114, which may be parallel with a second reference direction 216 ($\phi$=zero, where $\phi$ is a second separation angle between the second direction 214 and the second reference direction 216). As shown in FIG. 2A, the first camera 106 and the second camera 108 may be in an aligned state and may be used to determine distances of objects within an overlapping portion 218 of the first field of view 112 and the second field of view 114. Due to the separation distance (e.g., the distance of the portion 208 of the member 200) between the first camera 106 and the second camera 108, features in the images may be offset 220 from one another an amount proportional to a distance of the corresponding objects from the stereo camera pair. The offset 220 may be along a single axis (e.g., the "x-axis") since the cameras are static (in this figure) along a separation axis (e.g., the "y-axis"), and the remaining axis (e.g., the "z-axis") may not provide a measurable variance since it is along a same direction as the direction of the cameras. Ultimately, the offset 220 may be quantified as a change in the x direction of "f($\theta$,$\phi$)", as shown in a first instance of sample displacement data 222. The depiction of the offset 220 and other offsets shown in the figures are simplified, and thus do not show perspective or distortion due to a vantage point of a camera. These simplified depictions are used to convey general concepts discuss herein. Of course, comparison of actual imagery and features may involve accounting for variance in features due to perspective, distortion, and/or other variances between images from camera disparity, lenses, or from other factors.

Moving to FIG. 2B, the member 200 is shown subjected to one or more forces that cause the member to deform (bend) where ends of the member 200 (proximate to the mounting locations 204, 206) bend downward and away from the reference line 202, such as due to vibrational forces or other forces (e.g., impact force, inertial force, etc.). As shown in FIG. 2B, a result of the bending of the member 200 causes the cameras to direct toward each other, thereby increasing an overlap in the field of view and reducing an offset 224 along the x-axis as compared to the offset 220 shown in FIG. 2A. In FIG. 2B, $\sigma$ is greater than zero and $\phi$ is less than zero. The values of $\sigma$ and $\phi$ related to the offset 224 may have a proportional relationship with a number of pixels or other measured distance of the offset 224, and thereby enable determination of the deformation of the member 200 through monitoring and analysis of the offset 224. The offset 224 may be may be quantified as a change in the x direction of "f(θ,φ)", as shown in a second instance of sample displacement data 226.

Moving to FIG. 2C, the member 200 is shown subjected to one or more forces that cause the member to deform (bend) where ends of the member 200 (proximate to the mounting locations 204, 206) bend upward and toward the reference line 202, such as due to vibrational forces or other forces (e.g., impact force, inertial force, etc.). As shown in FIG. 2C, a result of the bending of the member 200 causes the cameras to direct away from each other, thereby decreasing an overlap in the field of view and increasing an offset 228 along the x-axis as compared to the offset 220 shown in FIG. 2A. In FIG. 2C, σ is less than zero and φ is greater than zero. The values of σ and φ relates to the offset 228 may have a proportional relationship with a number of pixels or other measured distance of the offset 228, and thereby enable determination of the deformation of the member 200 through monitoring and analysis of the offset 228. The offset 228 may be may be quantified as a change in the x direction of "f(θ,φ)", as shown in a third instance of sample displacement data 230.

Figure 3A:
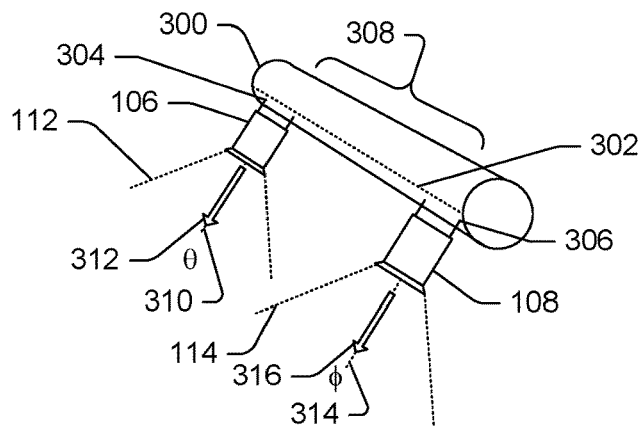
FIG. 3A-C are schematic diagrams showing deformation (twisting) of an illustrative member and imagery captured by a stereo camera pair used to measure the deformation of the member.
Figure 3A:
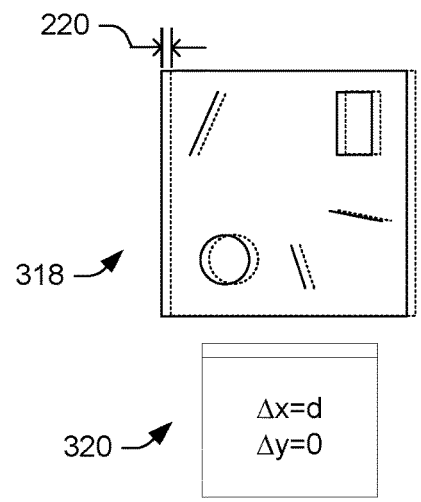
Figure 3B:
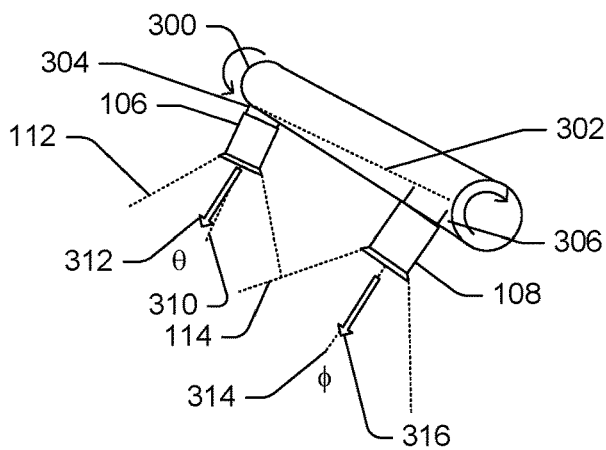
Figure 3B:
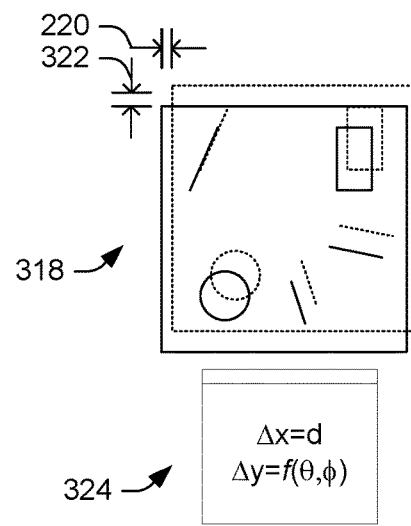
Figure 3C:
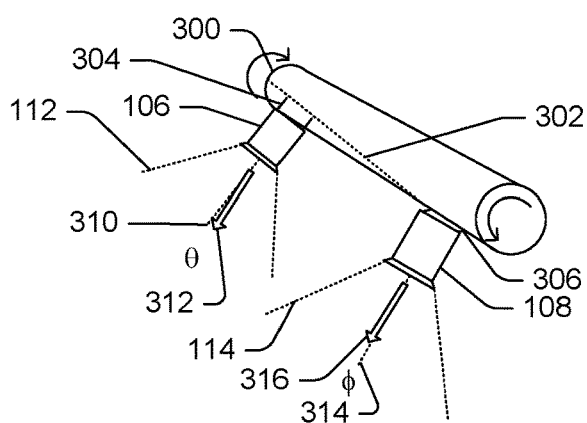
Figure 3C:
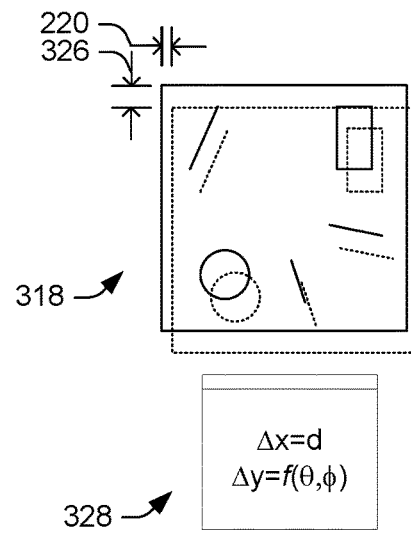

FIG. 3A-C are schematic diagrams showing deformation (twisting) of an illustrative member 300 and imagery captured by a stereo camera pair used to measure the deformation of the member. As shown in FIG. 3A, the member 300 may be a straight structure (as shown in comparison with a reference line 302) and not subject to any distortion due to forces imparted on the member 300. The forces may be due to impact with objects (e.g., the ground, another vehicle, debris, etc.), force due to inertial forces, and/or other forces which cause deformation of structures.

The member 300 may include the first camera 106 mounted at a first location 304 on the member 300 and the second camera 108 mounted at a second location 306 on the member 300. A portion 308 of the member 300 may span between the cameras. Using the techniques discussed herein, a deformation across the portion 308 of the member 300 may be determined rather than just a deformation at a specific location on or in the member 300.

In the non-deformed state shown in FIG. 3A, the first camera 106 may be directed in a first direction 310 within the first field of view 112, which may be parallel with a first reference direction 312 (σ=zero, where σ is a first separation angle between the first direction 210 and the first reference direction 312). Similarly, the second camera 108 may be directed in a second direction 314 within the second field of view 114, which may be parallel with a second reference direction 316 (φ=zero, where φ is a second separation angle between the second direction 314 and the second reference direction 316). As shown in FIG. 2A, the first camera 106 and the second camera 108 may be in an aligned state and may be used to determine distances of objects within an overlapping portion 318 of the first field of view 112 and the second field of view 114. Due to the separation distance (e.g., the distance of the portion 308 of the member 300) between the first camera 106 and the second camera 108, features in the images may include the offset 220 from one another an amount proportional to a distance of the corresponding objects from the stereo camera pair. The offset 220 may be along a single axis (e.g., the "x-axis") since the cameras are static (in this figure) along a separation axis (e.g., the "y-axis"), and the remaining axis (e.g., the "z-axis") may not provide a measurable variance since it is along a same direction as the direction of the cameras. Ultimately, the offset 220 may be quantified as a change in the x direction of "d", as shown in a first instance of sample displacement data 320.

Moving to FIG. 3B, the member 300 is shown subjected to one or more forces that cause the member to deform (twist) where ends of the member 300 (proximate to the mounting locations 204, 206) twist in opposite directions, such as due to vibrational forces or other forces (e.g., impact force, inertial force, etc.). As shown in FIG. 3B, a result of the twisting of the member 300 causes the cameras to direct away from each other in a first direction, thereby decreasing an overlap in the field of view and reducing an offset 322 along the y-axis as compared to a nominal offset shown in FIG. 2A. In FIG. 2B, σ is greater than zero and φ is less than zero. The values of σ and φ related to the offset 322 may have a proportional relationship with a number of pixels or other measured distance of the offset 322, and thereby enable determination of the deformation of the member 300 through monitoring and analysis of the offset 322. The offset 322 may be may be quantified as a change in the y direction of "f(θ,φ)", as shown in a second instance of sample displacement data 324.

Moving to FIG. 3C, the member 300 is shown subjected to one or more forces that cause the member to deform (twist) where ends of the member 300 (proximate to the mounting locations 204, 206) twist in opposite directions as shown in FIG. 3B, such as due to vibrational forces or other forces (e.g., impact force, inertial force, etc.). As shown in FIG. 3C, a result of the twisting of the member 300 causes the cameras to direct away from each other in a second direction, thereby decreasing an overlap in the field of view and reducing an offset 326 along the y-axis as compared to a nominal offset shown in FIG. 2A. In FIG. 2C, a is less than zero and φ is greater than zero. The values of σ and φ related to the offset 326 may have a proportional relationship with a number of pixels or other measured distance of the offset 326, and thereby enable determination of the deformation of the member 300 through monitoring and analysis of the offset 326. The offset 326 may be may be quantified as a change in the y direction of "f(θ,φ)", as shown in a third instance of sample displacement data 328.

The distortion of the member 200 shown and described with reference to FIGS. 2A-2C may be imposed on the member 300 shown and described with reference to FIGS. 3A-3C, or vice versa. Thus, multiple offsets may exist due to different types of distortion, including distortion from tension or compression of the members.

Figure 4:
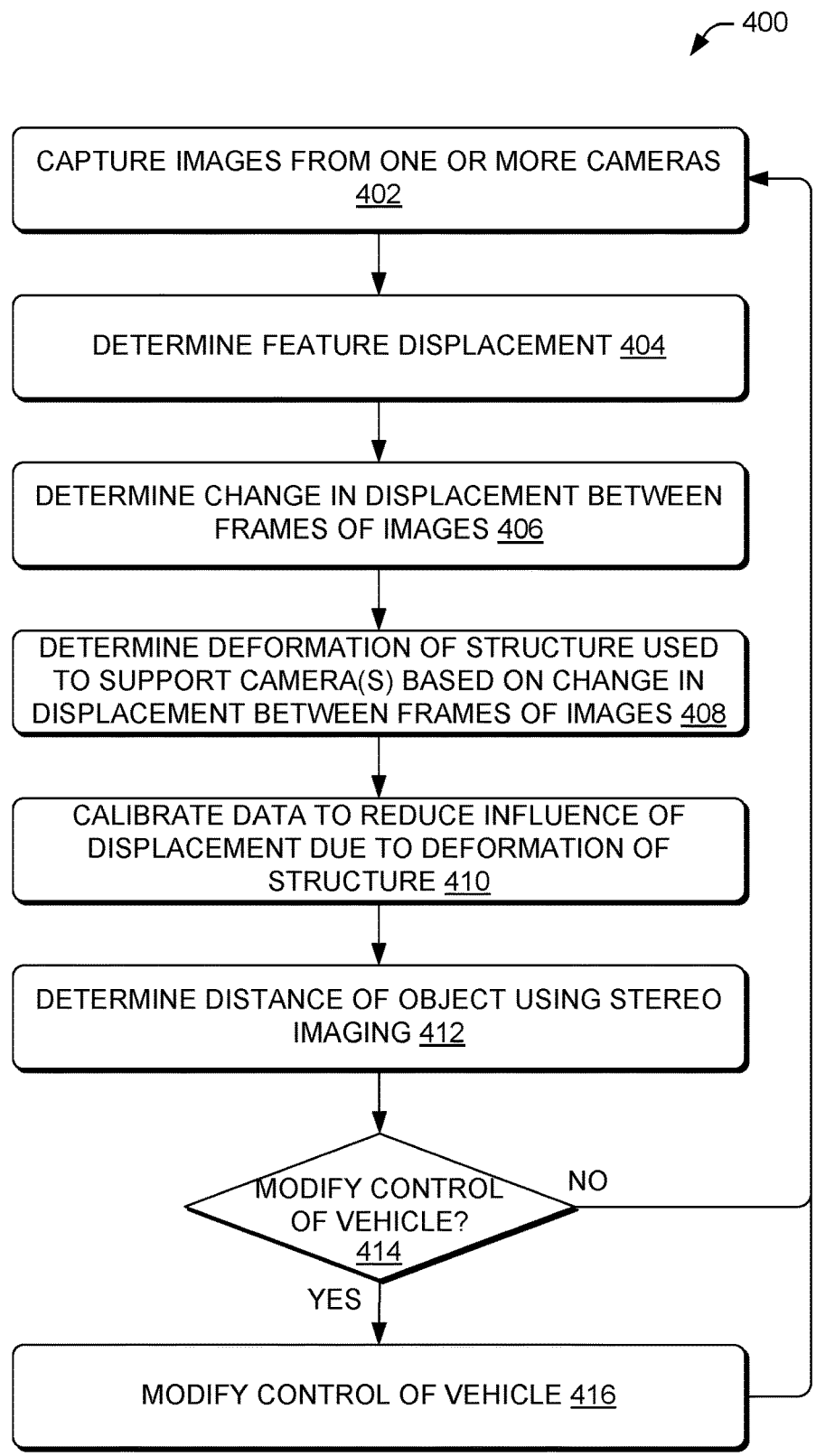
FIG. 4 is a flow diagram of an illustrative process to optically determine a deformation of a member using an imagery-based member deformation gauge and compensate for movement of the member to improve accuracy of distance calculation using a stereo camera pair.
Figure 5:
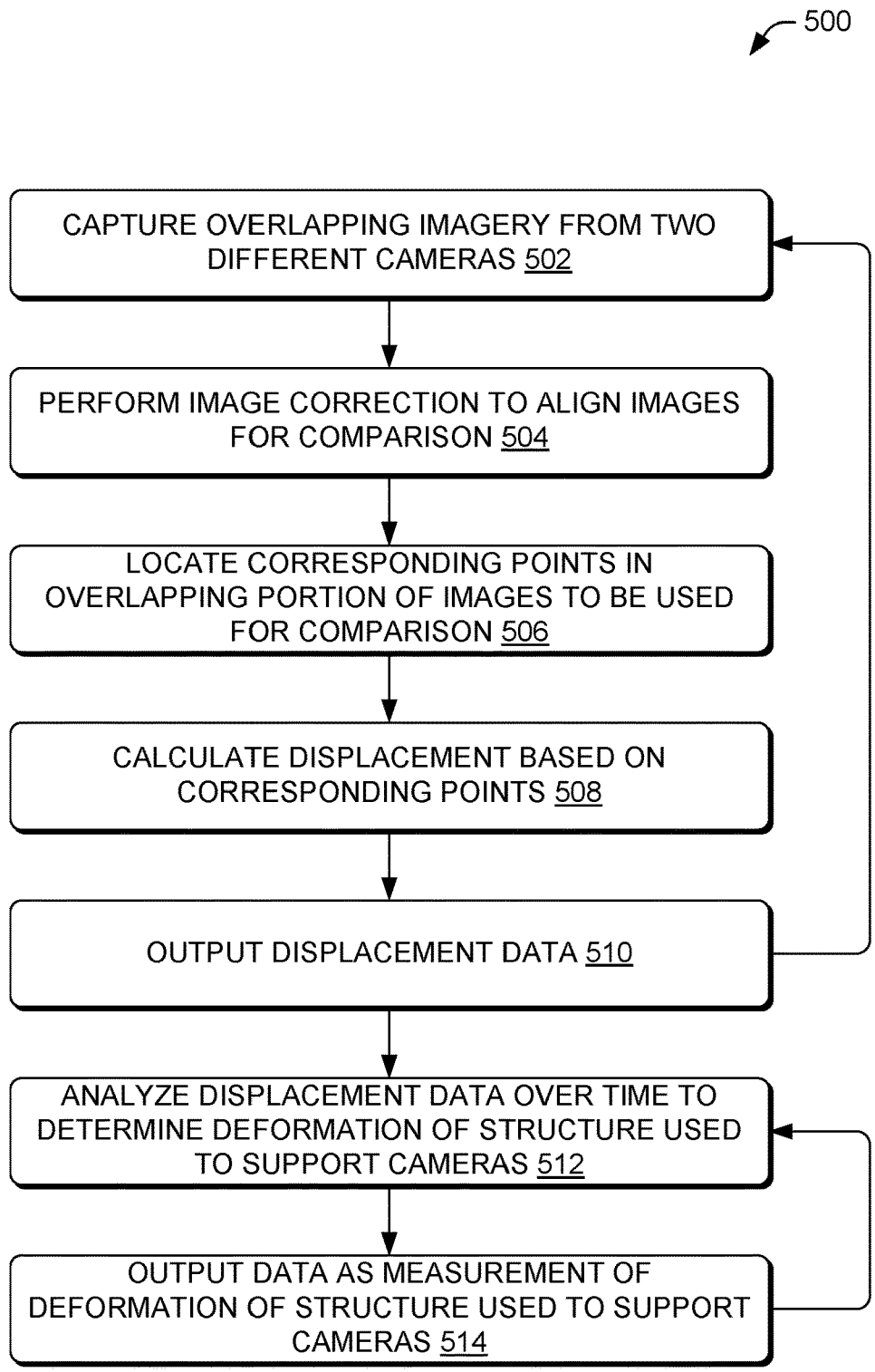
FIG. 5 is a flow diagram of an illustrative process to optically determine a deformation of a member using an imagery-based member deformation gauge.
Figure 6:
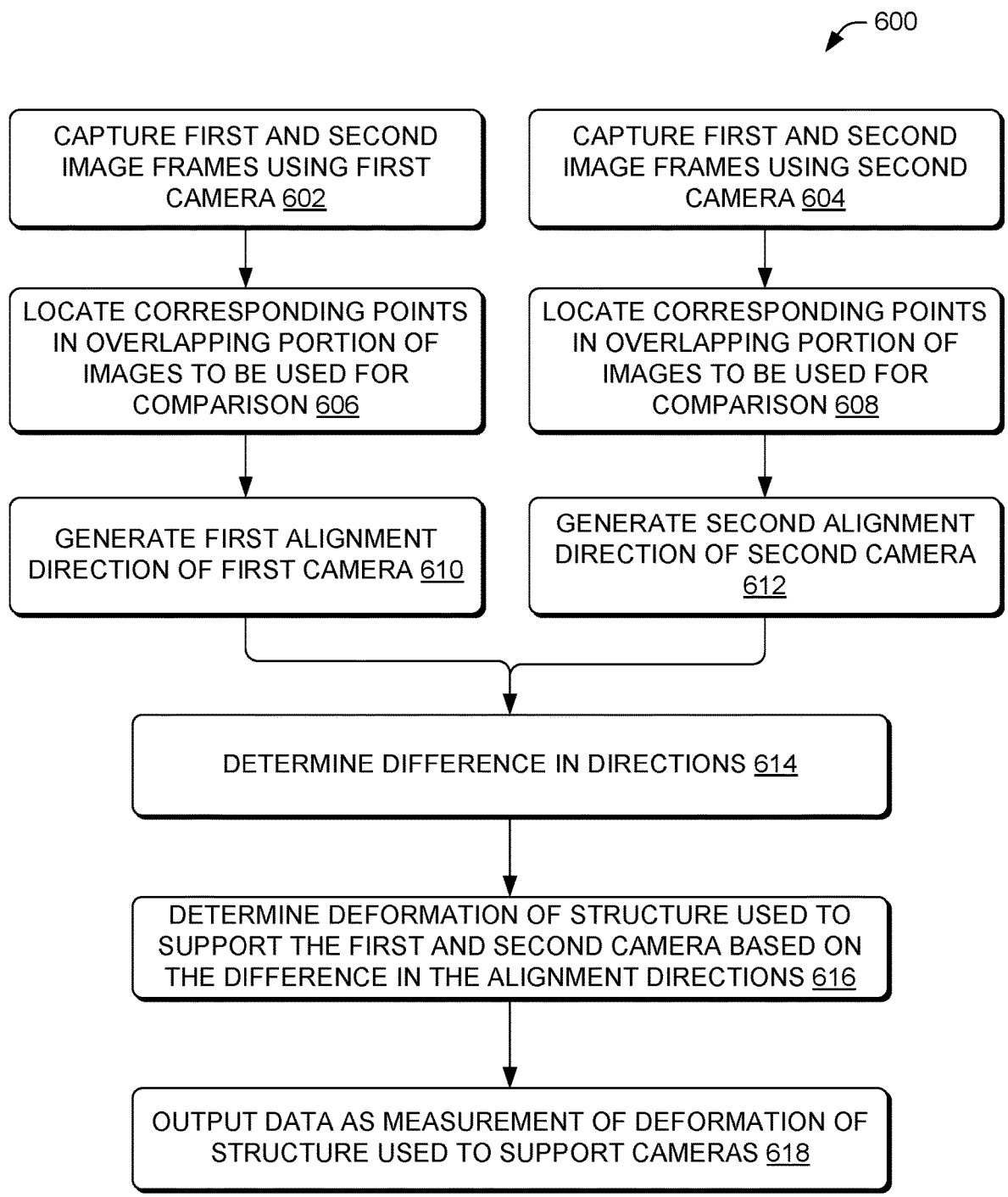
FIG. 6 is a flow diagram of another illustrative process to optically determine a deformation of a member using an imagery-based member deformation gauge.

FIGS. 4-6 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 4 is a flow diagram of an illustrative process 400 to optically determine a deformation of a member using an imagery-based member deformation gauge and compensate for movement of the member to improve accuracy of distance calculation using a stereo camera pair. The process 400 is described with reference to the environment 100.

At 402, images may be captured by one or more cameras. For example, the cameras may be the stereo camera pair 104 that are mounted to a same structure and separated by a distance. In some embodiments, at least some of the images may be stored, at least temporarily for processing as described below.

At 404, the images may be processed by at least one processor to determine a displacement of features or points that correlate to one another. In various embodiments, homography may be used to determine corresponding features in an overlapping portion of the images, such as features on a ground plane, along a horizon line, and/or in another direction (e.g., clouds, aircraft at a distance, etc.). In some embodiments, simultaneous localization and mapping (SLAM) techniques may be used to determine a change in location based on observed differences in images having correlated features (each image having at least a minimum number of matching/corresponding features). The displacement of the features or points may occur based on various occurrences. For example, the displacement may be based on movement of a stereo camera pair, such as from a trajectory of the stereo camera pair mounted on a vehicle. The displacement may be based on deflection of a structure that mounts the stereo camera pair, as shown above in FIGS. 2B, 2C, 3B, and 3C, and/or, of course, due to an offset in the stereo camera.

At 406, at least one processor may determine a change in the displacement between frames of images. For example, over time the displacement data determined at the operation 404 may be analyzed to determine changes between collection of different images as the cameras move relative to each other as a result of flex and distortion of the structure that secures the cameras. This change in displacement may be used to determine a deformation of the structure and a strain imposed on the structure, as discussed below. The change in the displacement over time may be analyzed by statistical means, such as by measuring and/or analyzing a standard deviation of the change, peaks of the change via tails of a bell curve (e.g., 10% and 90%, 20% and 80%, etc.), mean values, median values, and/or other values.

At 408, one or more processor may determine a deformation of the structure used to support the cameras based on changes in displacement between the frames of images. A strain may be determined based on a deformation of the structure. For example, the deformation may be determined based on the displacement of the features in a particular direction as observed in the images. As noted above, the displacement may be proportional to an angle of movement of the cameras relative to the structure. The strain may be computed by factoring in the distance that separates the cameras from one another, as well as structural features (e.g., a cross-sectional profile, material properties, etc.) of the structure.

At 410, one or more processor may calibrate data to reduce influence of the displacement due to deformation of the structure. For example, the displacement may be quantified, and then removed (e.g., subtracted out) of the image data to enable performing depth (distance) calculations with the image data, among other possible tasks performed on images captured by a stereo camera pair.

At 412, one or more processors may determine a distance of an object in the images using stereo imaging techniques and based on the calibrated data. Thus, measuring the movement or displacement in the images may enable determining deformation and/or strain imposed on a structure, as well as correcting error via a calibration, to enable calculation of more accurate distance information of objects shown in the imagery.

At 414, a vehicle may determine whether to modify controls based on the deformation determined at the operation 408 and/o based on the distance determined at the operation 412. For example, if the deformation is greater than a deformation envelope, the vehicle may determine to reduce use of controls that create a high deformation of the structure and/or take other precautions, such as discontinuing service of the vehicle at a next opportunity. In some embodiments, the vehicle may report system health information, which may include the deformation and/or whether the deformation exceeds the deformation envelope. This information may be used to cause the vehicle to be selected for and/or scheduled for service.

When the vehicle determines to modify a control (following the "yes" route from the decision operation 414), then the process 400 may advance to an operation 416 to modify the control of the vehicle. Otherwise, the process 400 may advance by following the "no" route from the decision operation 414 to the operation 402 to continue capture and analysis of images as described above.

In some embodiments, the process 400 may include determining an altitude of an aircraft that includes the structure and the stereo camera pair and initiating the calculating the change in the displacement at the operation 406 in response to the altitude being greater than a threshold altitude. The threshold altitude may be set to a distance where the fields of view of the cameras have enough overlap to identify a threshold number of corresponding features in the overlapping field of view to enable the performance of the operations described above.

FIG. 5 is a flow diagram of an illustrative process 500 to optically determine a deformation of a member using an imagery-based member deformation gauge. In particular, the process 500 analyzes a displacement of features in an overlapping region of images captured by a stereo camera pair at a first time and then compares that displacement to a displacement at a second time determined using the same process. On a vehicle with multiple camera pairs mounted at different locations, overlapping areas between the camera pairs' fields of view can also be used to measure airframe flex between the pair locations. Similar computer vision techniques can be used to measure the relative alignment between the pairs to assess the structural health of larger sections of the airframe. The process 500 is described with reference to the environment.

At 502, a stereo camera pair may capture overlapping imagery form two different camera that are mounted on a structure and separated by a distance. The imagery captured by the cameras may overlap at least a predetermined amount when the structure is not deformed.

At 504, one or more processors may perform image correction to align images for comparison. The image correction may include rotating images, applying filters, and/or making other corrections to enhance or enable analysis of features included in the images. The correction may include rectification where distortion in the image is removed or reduced or other types of rectification. In some instances, rectification may be limited to aligning the cameras in a certain direction or set of directions. However, rectification may also include removing lens distortion, warping images to alight horizontal axes, and so forth.

At 506, one or more processors may determine a location of corresponding points in the overlapping portion of the images to be used for comparison, such as to determine an offset of such features between the images. The points (or features) may be determined using imaging algorithms used to detect prominent points/features in an image.

At 508, one or more processors may calculate displacement (offset) between the features. The offset may be computed as a transform used to modify the points/features in one image to form the other image, or vice versa, or an intermediate image that is an average or median of the images. In some embodiments, the offset may be isolated as being along a single axis, such as the x-axis, and may be determined by a distance and/or number of pixels that separate the corresponding points/features.

At 510, one or more processors may output the displacement data, such as in a data store or other data repository (cache, random access memory (RAM), etc.). The operations 502 to 510 may continue to be performed in a loop to enable continued collection of images and displacement data over time.

At 512, one or more processors may analyze the displacement data over time to determine stress on the structure used to support the cameras. A change in displacement may be used to determine deformation of the structure and the strain imposed on the structure. The change in the displacement over time may be analyzed by statistical means, such as by measuring and/or analyzing a standard deviation of the change, peaks of the change via tails of a bell curve (e.g., 10% and 90%, 20% and 80%, etc.), mean values, median values, and/or other values. The strain may be based on a deformation of the structure. For example, the deformation may be determined based on the displacement of the features in a particular direction as observed in the images. As noted above, the displacement may be proportional to an angle of movement of the cameras relative to the structure. The strain may be computed by factoring in the distance that separates the cameras from one another, as well as structural features (e.g., a cross-sectional profile, material properties, etc.) of the structure.

At 514, one or more processors may output data as measurements of the stain on the structure and/or deformation of the structure used to support the cameras. This data may be used to determine a health of the structure, control inputs, and/or other information as discussed above. In particular, the deformation determined at the operation 512 may be a deformation across the structure, and may provide a holistic measurement of a health or integrity of the structure as compared to traditional deformation measurement devices, that are often limited to measurements of deformation at a point along the structure.

FIG. 6 is a flow diagram of another illustrative process 600 to optically determine a deformation of a member using an imagery-based member deformation gauge. The process 600 may be used to determine changes in direction of individual cameras based on overlapping portions of successive frames. This information may then be compared across the different cameras to determine movement of a structure that supports the cameras. The process 600 is described with reference to the environment 100.

At 602, a first camera may capture first and second images as successive frames of imagery. The first camera may be mounted on a same support as a second camera, and separated from the second camera by a known distance. The first camera and the second camera may be used as a stereo camera pair, or for other reasons.

At 604, the second camera may capture first and second images as successive frames of imagery. The capturing of images by the second camera may be coordinated or synchronized with the capture by the first camera.

At 606, at least one processor may location corresponding points in the overlapping portions of the images captured by the first camera.

At 608, at least one processor may location corresponding points in the overlapping portions of the images captured by the second camera.

At 610, at least one processor may calculate a first alignment direction associated with the first camera. In some embodiments, the first alignment direction may represent a change in direction of the first camera between the capture of the first image and the capture of the second image. For example, the first alignment direction may be determined by comparing locations of corresponding features visible in the first and second images, where the features are associated with object beyond a threshold distance from the cameras (e.g., considered at focal length infinity, etc.).

At 612, at least one processor may calculate a second alignment direction associated with the second camera. In some embodiments, the second alignment direction may represent a change in direction of the second camera between the capture of the first image and the capture of the second image.

Although only two cameras are discussed, the operations 602-612 may be employed for additional cameras to determine additional data points for analysis of a deformation imposed on a structure.

At 614, at least one processor may determine a different between the first alignment direction and the second alignment direction. Assuming that the structure is ridged and the cameras do not move relative to one another, the alignment directions may have virtually no difference in direction and magnitude. However, if the structure deforms between images, then a difference between the first alignment direction and the second alignment direction may reveal the deformation, and enable quantifying the deformation type (direction) and magnitude.

At 616, at least one processor may determine a deformation imposed on the structure based on the different in the alignment directions determined at the operation 614. For example, the resulting alignment direction from the operation 614 may be used to calculate a deformation of the member based on the distance that separates the cameras from one another, as well as structural features (e.g., a cross-sectional profile, material properties, etc.) of the structure.

At 618, at least one processor may output the measurement of the deformation of the structure used to support the cameras. For example, the output may be stored in a data store, and may be analyzed over time. For example, the analysis may include determining a standard deviation of a change in the deformation, a mean deformation, and so forth.

Although some of the operations discussed above refer to calculation of deformation, the calculations may determine a deformation of the structure among other possible information as described above with reference to at least the process 400.

Figure 7:
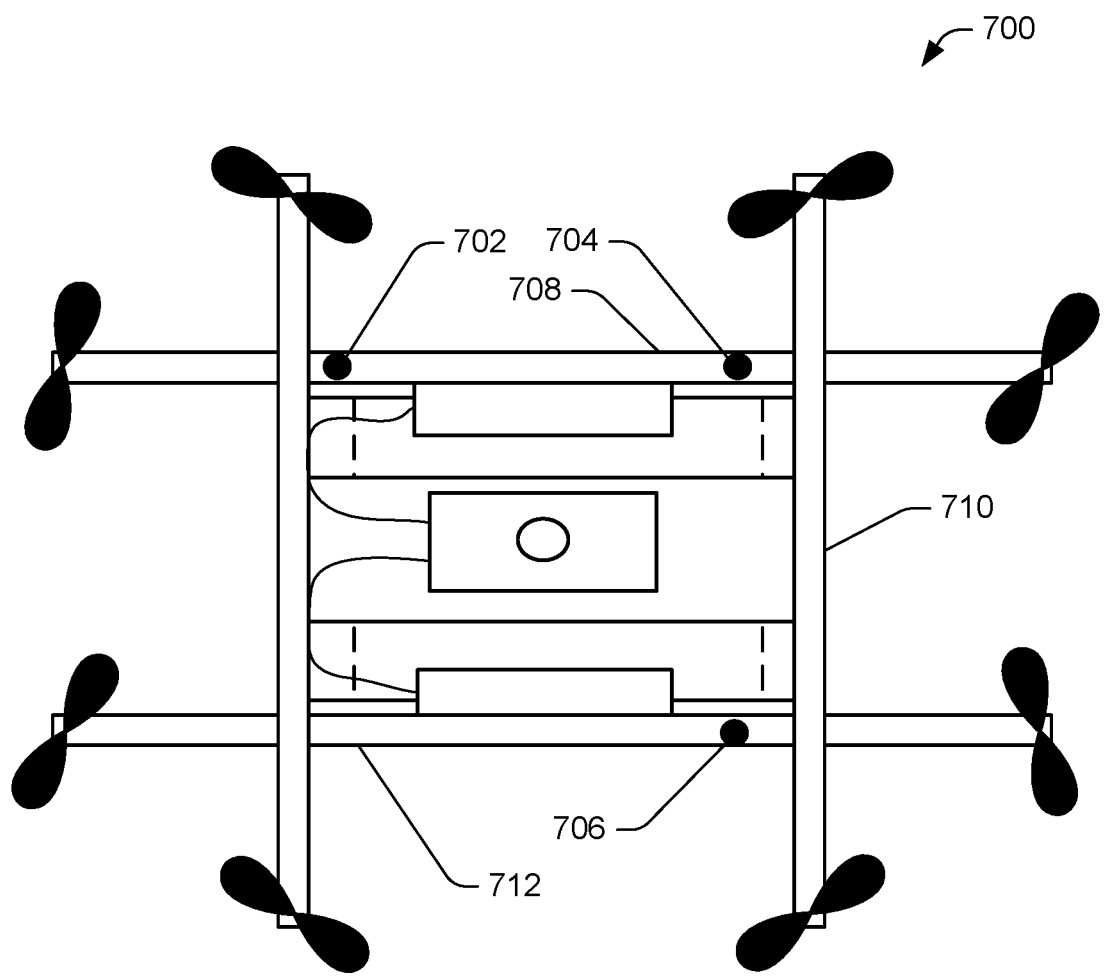
FIG. 7 is a schematic diagram of an airframe that deploys cameras used to detect deformation of the airframe using an imagery-based member deformation gauge.

FIG. 7 is a schematic diagram of an illustrative airframe 700 that deploys cameras used to detect deformation of the airframe using an imagery-based member deformation gauge. As shown in the illustrative airframe, cameras may be mounted at two or more locations. For example, a first camera 702 may be located at a first location, a second camera 704 may be mounted at a second location, and a third camera 706 may be mounted at a third location. The cameras may be mounted on a first member 708, a second member 710, or a third member 712. A determination of the location of the cameras may result in a different measurement of deformation of a different portion of the airframe, as well as accuracy and variance of distance information determined using images from a stereo camera pair. Namely, longer the distance that the cameras are apart, the greater the variance of distance information (e.g., greater error), while providing deformation measurement over a larger portion of the airframe. Thus, if the cameras used for a deformation measurement include the first camera 702 and the third camera 706, the deformation measurement may include deformation of each of the members 708-712. However, if the cameras used for a deformation measurement include the first camera 702 and the second camera 704, the deformation measurement may only include deformation of the first member. In the latter example, the distance calculation may be subject to less error since the cameras are coupled to a single member which is likely to experience less deformation than multiple members coupled together such as the members 708-712.

Thus, a designer may choose to place cameras in particular locations based on various factors including a line-of-sight available at a location, a configuration of an airframe and possible portions that are desired to be monitored for deformation, and accuracy of depth calculations using the mounted camera.

Figure 8:
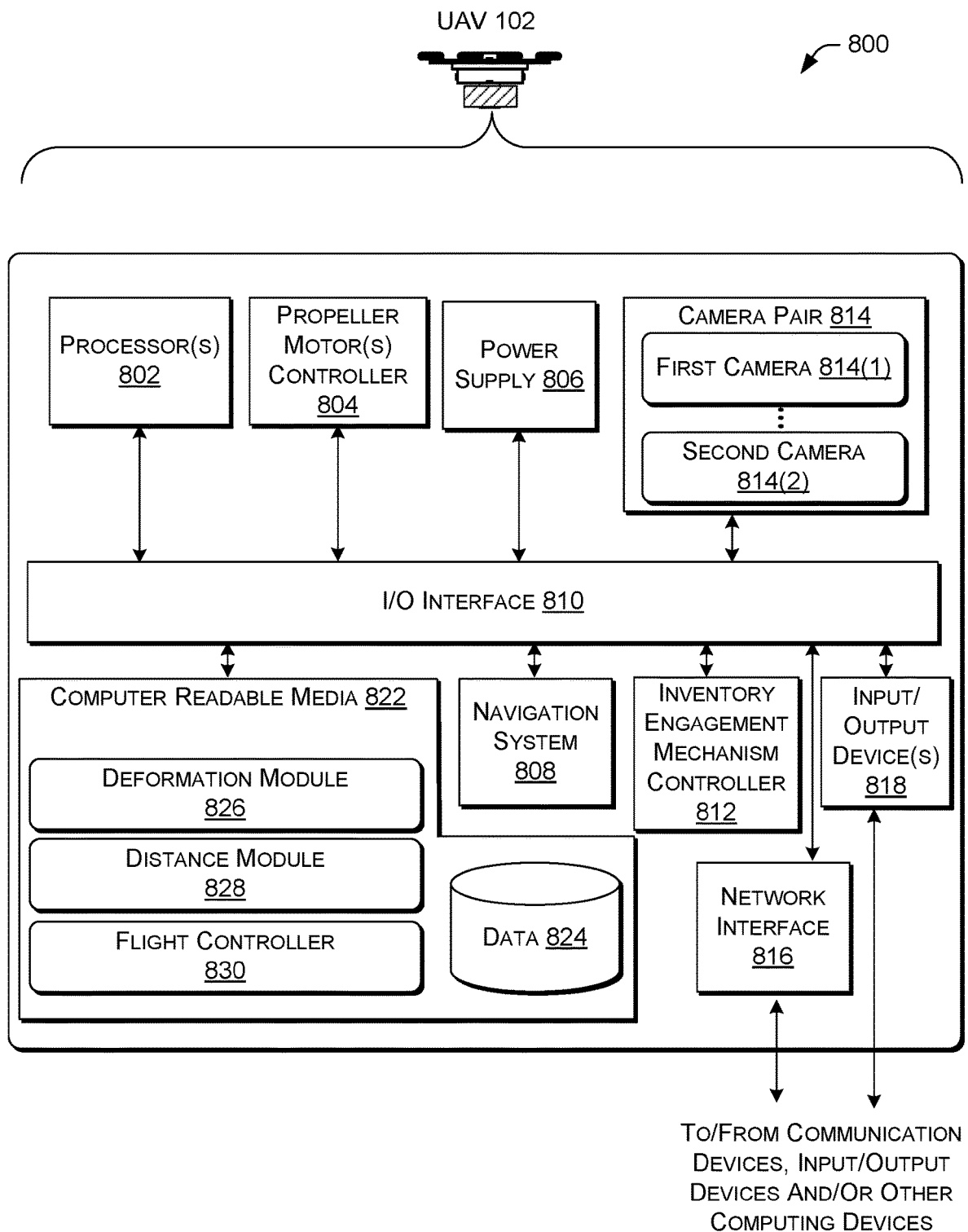
FIG. 8 is a block diagram of an illustrative UAV that employs an imagery-based member deformation gauge.

FIG. 8 is a block diagram of an illustrative UAV 800 that employs an imagery-based member deformation gauge. The UAV architecture 800 may be used to implement the various systems, devices, and techniques discussed above. In the illustrated implementation, the UAV architecture 800 includes one or more processors 802, coupled to a non-transitory computer readable media 822 via an input/output (I/O) interface 810. The UAV architecture 800 may also include a propeller motor controller 804, power supply module 806 and/or a navigation system 808. The UAV architecture 800 further includes an inventory engagement mechanism controller 812 to interact with a package, a camera pair 814 (including a first camera 814(1) and a second camera 814(2)), a network interface 816, and one or more input/output devices 818.

In various implementations, the UAV architecture 800 may be implemented using a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable media 822 may be configured to store executable instructions/modules, data, flight paths, and/or data items accessible by the processor(s) 802. In various implementations, the non-transitory computer readable media 822 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, data and/or flight paths may be received, sent or stored upon different types of computer-accessible media, such as non-transitory media, or on similar media separate from the non-transitory computer readable media 822 or the UAV architecture 800. Generally speaking, a non-transitory, computer readable memory may include storage media or memory media such as flash memory (e.g., solid state memory), magnetic or optical media (e.g., disk) coupled to the UAV architecture 800 via the I/O interface 810. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 816.

In one implementation, the I/O interface 810 may be configured to coordinate I/O traffic between the processor(s) 802, the non-transitory computer readable media 822, and any peripheral devices, the network interface or other peripheral interfaces, such as input/output devices 818. In some implementations, the I/O interface 810 may perform any necessary protocol, timing or other data transformations to convert data signals from one component (e.g., non-transitory computer readable media 822) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable media 822, may be incorporated directly into the processor(s) 802.

The propeller motor(s) controller 804 communicates with the navigation system 808 and adjusts the power of each propeller motor to guide the UAV along a determined flight path. The power supply module 806 may control the charging and any switching functions associated with one or more power modules (e.g., batteries) of the UAV.

The navigation system 808 may include a GPS or other similar system that can be used to navigate the UAV to and/or from a location. The inventory engagement mechanism controller 812 communicates with the actuator(s) or motor(s) (e.g., a servo motor) used to engage and/or disengage inventory, such as the package 108. For example, when the UAV is positioned over a level surface at a delivery location, the inventory engagement mechanism controller 812 may provide an instruction to a motor that controls the inventory engagement mechanism to release the package 108.

The camera pair 814 may include the first camera 814(1) and the second camera 814(2). The cameras may be used to track distances of objects using techniques such as homography based on comparison of features at a distance, such as features on a ground plane, a horizon line, distant clouds or aircraft, and so forth. In some embodiment, as discussed above, the cameras may capture imagery that is used to determine a deformation of a structure used to support the cameras, such as an airframe or other member.

The network interface 816 may be configured to allow data to be exchanged between the UAV architecture 800, other devices attached to a network, such as other computer systems, and/or with UAV control systems of other UAVs. For example, the network interface 816 may enable wireless communication between numerous UAVs. In various implementations, the network interface 816 may support communication via wireless general data networks, such as a Wi-Fi network. For example, the network interface 816 may support communication via telecommunications networks such as cellular communication networks, satellite networks, and the like.

The input/output devices 818 may, in some implementations, include accelerometers and/or other input/output devices commonly used in aviation. Multiple input/output devices 818 may be present and controlled by the UAV architecture 800. One or more of these sensors may be utilized to assist in landings as well as avoiding obstacles during flight.

In some embodiments, the computer readable media 822 may store at least a deformation module 826, a distance module 828, and a flight controller 830, the approach notification module 116, the object detection module 118, and the communication module 120. The components may access and/or write data 824, which may include flight plan data, log data, destination data, imagery captured by the camera pair 814, and so forth.

The deformation module 826 may be used to perform at least the calculations described in the operations 402-408 described with reference to the process 400 shown in FIG. 4, as well as the operations shown in FIGS. 5 and 6. The deformation module 826 may utilize homography to determine displacement between different features in overlapping portions of images to compare movement of cameras relative to one another, and thereby determine the deformation of a structure (e.g., airframe, etc.) that supports the camera pair 814.

The distance module 828 may determine a distance of an image based on analysis of imagery captured by the camera pair 814, possibly using at least some information from the deformation module 826. In some embodiments, the distance module 828 may calibrate data to remove or reduce an influence of displacement of the cameras due to deformation of the structure used to mount the cameras.

The flight controller 830 may control operation and flight of the UAV. The flight controller 830 may receive input from the distance module 828 to inform navigation, such as to identify objects, for avoidance purposes, and for other reasons. The flight controller may receive input from the deformation module 826, which may be used to place restrictions on flight behavior and controls, such as when a deformation exceeds a deformation envelope.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV architecture 800 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV architecture 800 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV architecture 800. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV architecture 800 may be transmitted to the UAV architecture 800 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations.

Figure 9:
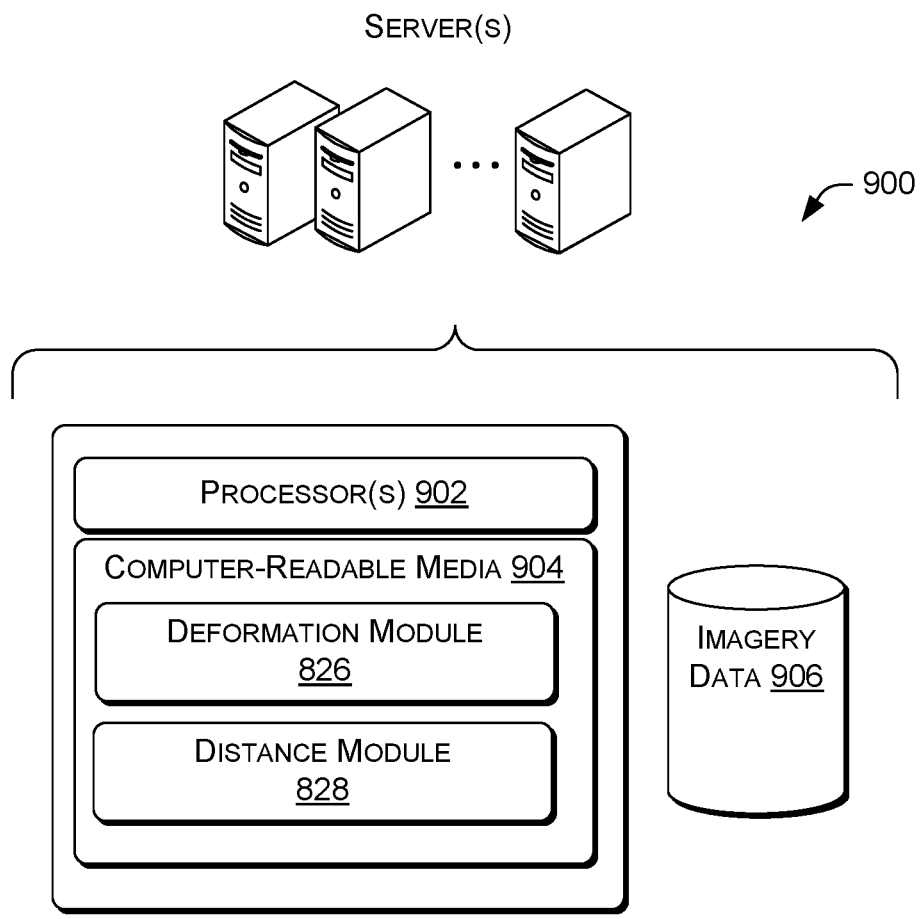
FIG. 9 is a block diagram of an illustrative computing architecture that processes optical data to determine a deformation of a member. The computing architecture may be employed with the UAV shown in FIG. 8, with other vehicles or structures, and/or in computing devices associated with a control center.

FIG. 9 is a block diagram of an illustrative computing architecture 900 that processes optical data to determine a deformation of a member. The computing architecture 900 may be employed with the UAV shown in FIG. 8, with other vehicles or structures, and/or in computing devices associated with the central command 126 shown in FIG. 1. The computing architecture 900 may be implemented in a distributed or non-distributed computing environment.

The computing architecture 900 may include one or more processors 902 and one or more computer readable media 904 that stores various modules, applications, programs, or other data. The computer-readable media 904 may include instructions that, when executed by the one or more processors 902, cause the processors to perform the operations described herein.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 904 may store the deformation module 826 and/or the distance module 828 as discussed above. The modules may perform the operations described above by processing imagery data 906, which may be collected by the camera pair 814 described with reference to FIG. 8, and provided to the computing architecture 900 via the network 128, for example.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
capturing, at a first time, first images by a stereo camera pair that includes an overlapping field of view, the stereo camera pair including a first camera and a second camera spatially separated by and mounted to a structure;
capturing, at a second time, second images by the stereo camera pair;
determining a first displacement direction by comparing first corresponding points identified in the first images and the second images captured by the first camera, wherein the first displacement direction comprises a first angle of movement of the first camera of the stereo camera pair relative to the structure;
determining a second displacement direction by comparing second corresponding points in the first images and the second images captured by the second camera, wherein the second displacement direction comprises a second angle of movement of the second camera of the stereo camera pair relative to the structure;
calculating a difference in camera displacement directions based at least in part on the first displacement direction and the second displacement direction: and
determining a deformation of the structure used to support the stereo camera pair based at least in part on the difference in the camera displacement directions.

2. The method as recited in claim 1, further comprising:
calibrating data associated with at least the first images or the second images to create calibrated data to reduce an influence of camera displacement; and
calculating a distance of an object shown in the first images or the second images based at least in part on the calibrated data.

3. The method as recited in claim 1, further comprising:
comparing the deformation of the structure to a deformation envelope;
determining that the deformation of the structure exceeds the deformation envelope; and
providing an operational control to control a vehicle based on determination that the deformation of the structure exceeds the deformation envelope.

4. The method as recited in claim 1,
wherein determining the first displacement direction and the second displacement direction includes performing homography using a plane defined by objects imaged on a ground below an aircraft, the aircraft including the structure and the stereo camera pair.

5. The method as recited in claim 1, wherein the difference in camera displacement directions is calculated along an axis that is orthogonal to an axis of the separation of the cameras in the stereo camera pair maintained by the structure, and further comprising determining, based at least in part on the deformation, a strain imposed on the structure.

6. A system comprising:
a stereo camera pair to capture first images at a first time and second images at a second time;
a member to support a first camera and a second camera in the stereo camera pair; and
a processor to:
determine a first displacement direction by comparing first corresponding points identified in overlapping portions of the first images and the second images captured by the first camera, wherein the first displacement direction comprises a first angle of movement of the first camera in the stereo camera pair relative to the member;
determine a second displacement direction by comparing second corresponding points in overlapping portions of the first images and the second images captured by the second camera, wherein the second displacement direction comprises a second angle of movement of the second camera in the stereo camera pair relative to the member;
calculate a difference in camera displacement directions based at least in part on the first displacement direction and the second displacement direction: and
determine a deformation of the member used to support the stereo camera pair based on the difference in the camera displacement directions.

7. The system as recited in claim 6, wherein the member is an airframe of an unmanned aerial vehicle.

8. The system as recited in claim 6, wherein the processor is further configured to:
calibrate data associated with at least the first images or the second images to create calibrated data to reduce an influence of camera displacement; and
calculate a distance of an object based at least in part on the calibrated data.

9. The system as recited in claim 6, wherein the processor is further configured to:
compare the deformation of the member to a deformation envelope;
determine that the deformation of the member exceeds the deformation envelope; and
provide an operational control to control a vehicle based on a determination that the deformation of the member exceeds the deformation envelope.

10. The system as recited in claim 6, wherein determining the first displacement direction and the second displacement direction includes performing homography using at least one of a horizon line or a plane defined by objects located on a ground below an aircraft and imaged from above the ground.

11. The system as recited in claim 6, wherein the calculating the difference in the camera displacement directions occurs in real-time or near real time onboard an aircraft to monitor a health of the member, the aircraft including the member and the stereo camera pair.

12. The system as recited in claim 6, wherein the processor is further configured to:
determine an altitude of an aircraft that includes the member and the stereo camera pair; and
initiate the calculating the difference in the camera displacement directions in response to the altitude being greater than a threshold altitude.

13. The system as recited in claim 6, wherein to determine the deformation of the member is based at least in part on an angular displacement of the member over a distance that separates the first camera from the second camera.

14. The system as recited in claim 6, wherein the deformation is due to at least one of bending of the member or torque imposed on the member.

15. The system as recited in claim 6, wherein the processor is further configured to determine a standard deviation of multiple samples of the camera displacement directions over time, and wherein calculation of the deformation is based at least in part on the standard deviation.

16. The system as recited in claim 6, wherein the first camera is located at a first position along the member and the second camera is located at a second position along the member to determine the deformation of a portion of the member between the first position and the second position.

17. A method comprising:
capturing a first image and a second image with a first camera supported by a structure within an aerial vehicle;
locating first corresponding points in overlapping portions of the first image and the second image of the first camera;
determining a first change in direction of the first camera based on the first corresponding points of the first image and the second image of the first camera, wherein the first change comprises a first angle of movement of the first camera relative to a second camera;
capturing a third image and a fourth image with a second camera supported by the structure and separated from the first camera by a distance, wherein the capturing the third image and the fourth image is coordinated with the capturing of the first image and the second image;
locating second corresponding points in overlapping portions of the third image and the fourth image of the second camera:
determining a second change in direction of the second camera based on the second corresponding points of the third image and the fourth image of the second camera, wherein the second change comprises a second angle of movement of the second camera relative to the first camera;
determining a difference in the first change in direction and the second change in direction; and
determining a deformation of the structure based at least in part on the difference in the first change in direction and the second change in direction.

18. The method as recited in claim 17, wherein the first image and the second image are first successive frames of imagery captured at or within a threshold amount of time by the first camera, and the third image and the fourth image are second successive frames of imagery captured at or within the threshold amount of time by the second camera.

19. The method as recited in claim 17, wherein the first change in direction includes a first alignment direction and the second change in direction includes a second alignment direction, and wherein the determining the difference includes determining a difference in the first alignment direction and the second alignment direction.

20. The method as recited in claim 17, wherein the first camera and the second camera are a stereo camera pair, and further comprising:
calibrating data associated with the first camera, the second camera, or both to create calibrated data to reduce an influence of the difference in the first change in direction and the second change in direction; and
calculating a distance of an object based at least in part on the calibrated data of the stereo camera pair.

* * * * *